(12) United States Patent
Trautmann

(10) Patent No.: US 8,510,708 B2
(45) Date of Patent: Aug. 13, 2013

(54) METHOD FOR OPTIMIZING A CONTROL PROGRAM FOR ACTUATORS

(75) Inventor: Wolfgang Trautmann, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 353 days.

(21) Appl. No.: 12/813,560

(22) Filed: Jun. 11, 2010

(65) Prior Publication Data

US 2011/0218654 A1 Sep. 8, 2011

(30) Foreign Application Priority Data

Mar. 2, 2010 (DE) .......................... 10 2010 009 994

(51) Int. Cl.
*G06F 9/44* (2006.01)
*G06F 9/45* (2006.01)

(52) U.S. Cl.
USPC ............ 717/106; 717/105; 717/109; 717/151

(58) Field of Classification Search
None
See application file for complete search history.

(56) References Cited

U.S. PATENT DOCUMENTS

| | | | |
|---|---|---|---|
| 5,740,443 A | 4/1998 | Carini | |
| 6,072,951 A | 6/2000 | Donovan et al. | |
| 8,156,481 B1 * | 4/2012 | Koh et al. | 717/151 |
| 8,230,390 B2 * | 7/2012 | Koster | 717/109 |
| 2004/0049769 A1 * | 3/2004 | Lueh et al. | 717/158 |
| 2008/0098349 A1 | 4/2008 | Lin et al. | |
| 2008/0127057 A1 | 5/2008 | Costa et al. | |
| 2008/0127058 A1 * | 5/2008 | Bray | 717/106 |
| 2008/0196002 A1 * | 8/2008 | Koster | 717/106 |
| 2012/0036493 A1 * | 2/2012 | Moosmann et al. | 717/105 |

FOREIGN PATENT DOCUMENTS

| | | |
|---|---|---|
| WO | WO 95/02863 | 1/1995 |
| WO | WO95/02883 | 1/1995 |

OTHER PUBLICATIONS

Pederson et al., Evolving robust controller parameters using covariance matrix adaptation, Jul. 2010, 8 pages.*
Ipek et al., Self-Optimizing Memory Controllers: A Reinforcement Learning Approach, Jun. 2008, 12 pages.*

(Continued)

*Primary Examiner* — Thuy Dao
(74) *Attorney, Agent, or Firm* — Orrick Herrington & Sutcliffe, LLP

(57) ABSTRACT

Method for optimizing a control program for actuators, wherein by means of the control program, at least one first function comprising the allocated program lines is executed to control a first actuator, the control program being in the form of an executable model in a first step, and, based on the model, an instrumented program code being generated by a code generator for a test control program, and a first parameter being allocated to the first function, and wherein by means of a test unit, the test control program is processed repeatedly with predefined input values and, based on the result of this processing, a value is allocated to the first parameter, and the value allocated to the first parameter is stored in a memory area allocated to the model, and in a second step, the optimized control program is generated by the code generator, the value allocated to the first parameter being read out of the allocated memory area by an optimization unit of the code generator and compared with a predefined threshold value, and then a decision is made by the optimization unit on the basis of the result of the comparison as to whether the allocated program lines are to be tied directly into the control program or tied in by means of a subprogram retrieval.

15 Claims, 2 Drawing Sheets

(56) References Cited

OTHER PUBLICATIONS

Figure 1:
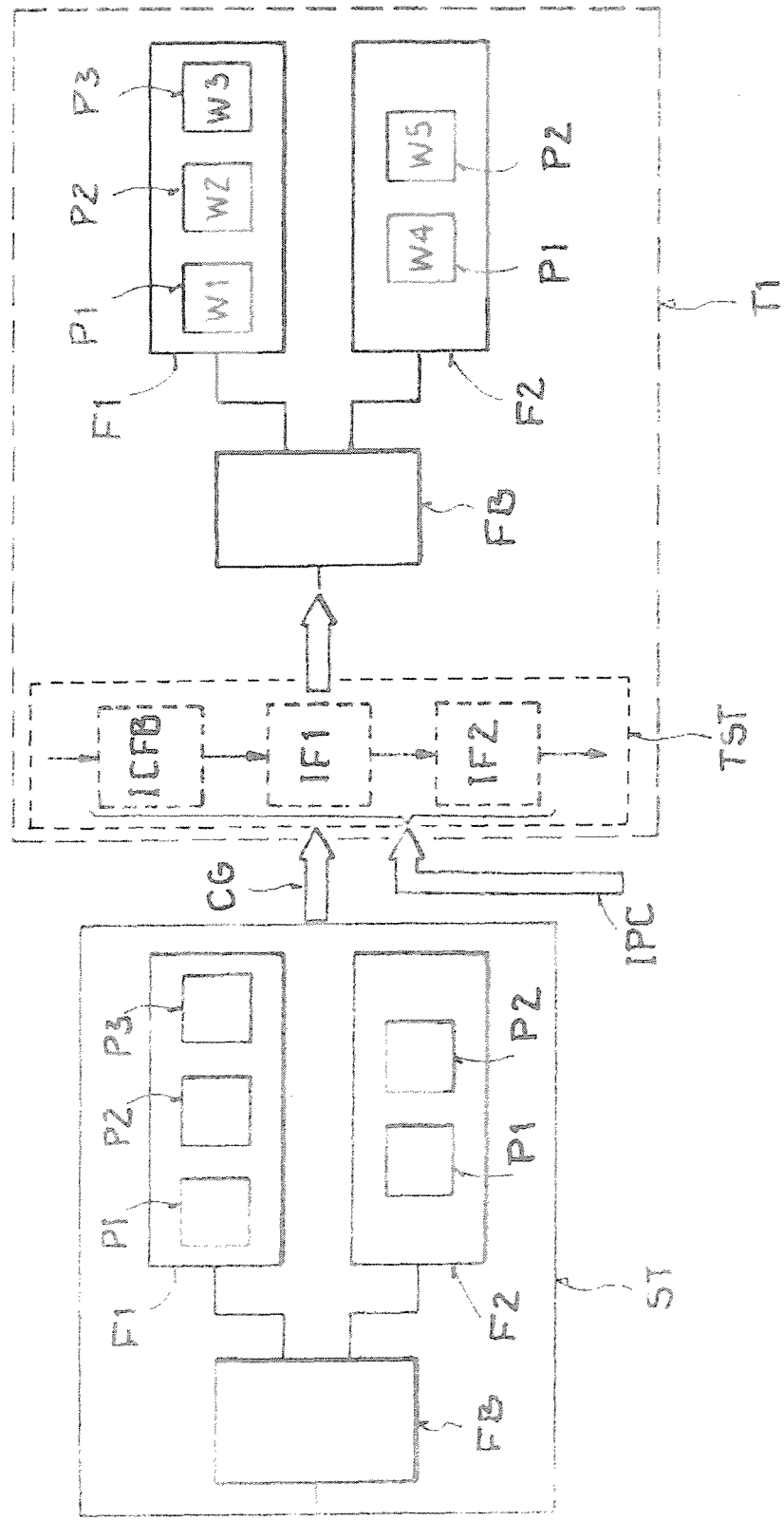

Gisler, Roland., "Module Software Components Testing", Module SWK—(C) in 2008, 1-41 (with English language translation).

Mühl, Gero, GMD Research Series, Design of Tools to the Event-based Observation of Distributed Real-Time Systems, 1998, 1-70, http://historical.ncstrl.org/tr/fulltext/tr/ercimgmd/rs-set-1998-18.txt (with English language translation).

HP C/HP-UX Programmer's Guide, HP 9000 Computers, Ninth Edition, Hewlett Packard, B3901-90002, HP C/HP-UX Compiler, Jun. 2000, pp. 1-268.

European Search Report for EP11153945 dated Jul. 19, 2011 (with machine translation).

Wen-Mei W. Hwu et al "Inline Function Expansion for Compiling C Programs" Coordinated Science Laboratory, Jul. 1, 1989, ACM Sigplan Notices, ACM, Association for Computing Machinery, New York, NY, pp. 246-257.

Kang Su Gatlin "Profile-Guided Optimization with Microsoft Visual C++ 2005" Microsoft Corporation, Mar. 1, 2004, 9 pages.

German Search Report dated Dec. 22, 2010 (with machine translation)—(8 pages).

"Short Way to the Quick Code", Jens Braunes, Feb. 12, 2010, (with machine translation)—(20 pages).

"Code Optimising with Visual C++", Mark Lacey, @ 2010 Microsoft Corporation (with machine translation)—(12 pages).

TargetLink 3.0, Embedded Success dSPACE, www.dspace.com, 52 pages, Feb. 2009.

dSpace TargetLink, Embedded Success (60 pages), 2010.

Optimizing HP C Programs, Profile-Based Optimization, Chapter 4, pp. 84-87, Jun. 2000.

\* cited by examiner

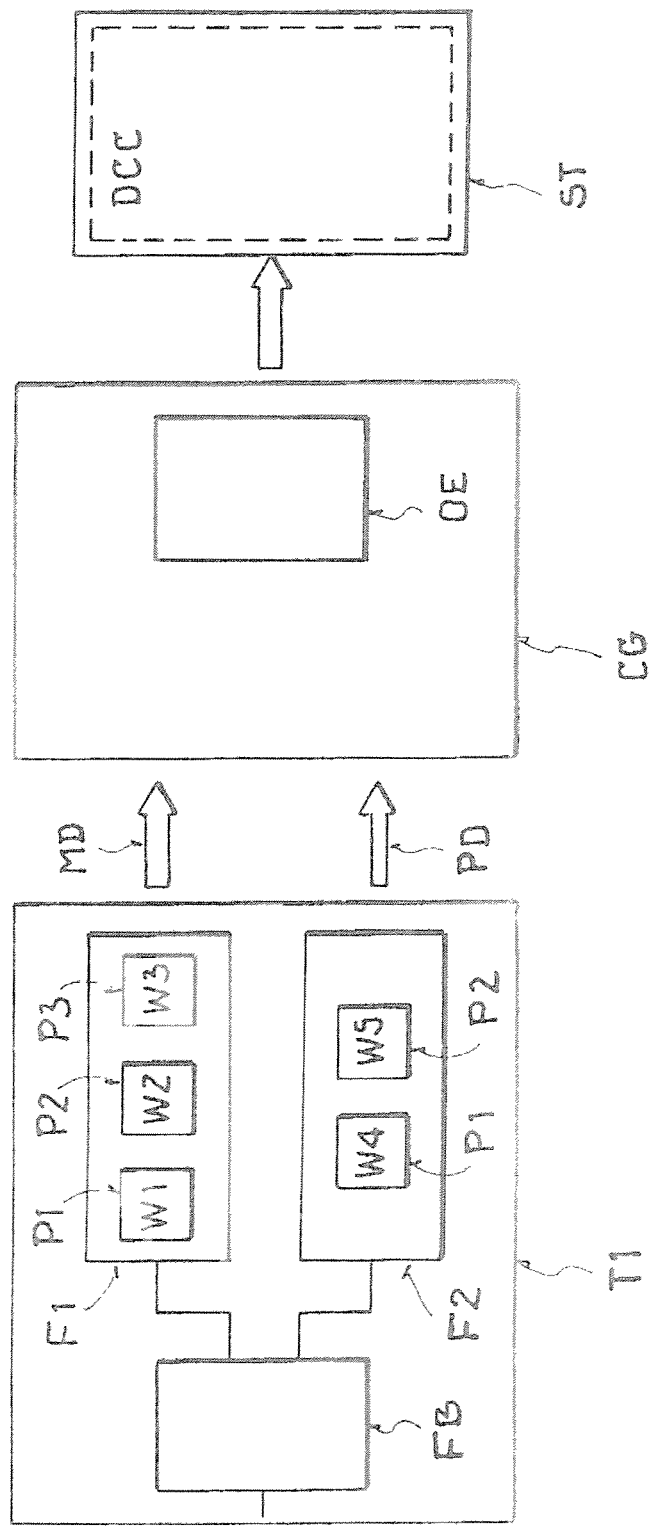

METHOD FOR OPTIMIZING A CONTROL PROGRAM FOR ACTUATORS

RELATED APPLICATIONS

The present invention claims all rights of priority to German Patent Application No. 10 2010 009 994.5, filed on Mar. 2, 2010, which is hereby incorporated by reference.

DESCRIPTION

The present invention relates to a method for optimizing a control program for actuators.

Methods for optimizing a control or regulating program are referred to below as control programs. Actuators may be used in mechatronic systems, e.g., for controllers in the automotive industry or in the aviation industry.

Control programs are used in controlling actuators, monitoring complex operations, detecting and processing a plurality of values of ambient data and/or user input. Control programs contain functions for processing the input values or input signals such as data from sensor signals and/or user input. Corresponding output values or output signals are then output by control programs, e.g., to control actuators in processes. For information purposes, the output values or signals may also be output to display devices or data files.

The complexity of control programs has increased steadily due to the multitude of functions implemented. In reuse or expansion of controllers with new functions, the memory demand for the program to be executed is typically increased, often exceeding the available memory capacity. Newly designed systems are often subject to strict resource limitations. In addition, time-critical control tasks in control programs should be processed in the available execution time.

First, in the case of control tasks and/or functions to be executed very rapidly, it is advantageous for the program lines allocated to a function to be tied into the control program directly at the point where the function is needed, because not only is it possible to eliminate time-consuming, accessing of functions in this way, but also additional optimization options are often available, e.g., to save on intermediate variables. On the other hand, with repeated use of the function at different locations in the control program, the total length of the control program and thus the memory used for the program to be executed are definitely increased. To minimize the demand for memory capacity, it is desirable to tie in the program lines of the commonly retrieved functions as subprograms and to process the subprograms by jumping forward and jumping back. In this way, however, the execution time of the control program for the function is lengthened due to copy operations for transfer of variables of the function, among other things, and/or due to the fact that the so-called stack memory or "stack" must be built up and then dismantled for the transfer parameters and commands for jumping forward and back must be executed.

For development of the control programs, e.g., software code for the control units in the automotive industry, model-based development tools are being used to an increasing extent. These make it possible to specify the functionality of the control program graphically at first in the form of models. The specification of the functionality takes place here at a higher level of abstraction than a specification on the level of textual software code such as C code. On the one hand, this allows a better clarity of the functionality of the control program, while on the other hand, such models can be reused better because they have a more general character due to the higher level of abstraction and are not yet defined in a concrete manner of implementation and/or programming. Additional advantages in use of model-based development tools are obtained by the fact that the functionality of the models can be tested at a high level of abstraction, i.e., the model can be executed in so-called "model-in-the-loop" tests and checked for errors. Furthermore, on the basis of a model, code for a control program can be generated automatically by a code generator. This is C code, for example, which can run on a controller processor, or VHDL code for an FPGA or ASIC, for example.

The code generated may then be tested in the next test step. Testing of the software code is also referred to as "software-in-the-loop." The code is tested for errors with respect to its functionality. In another step, the code may also be executed on an external target processor. In this case, we speak of a "processor-in-the-loop" simulation. To test the functionality of the software code, so-called "instrumented program code" is often generated as a control program by the code generator and executed in a first step. The instrumented code is not fully optimized but instead contains, for example, additional logging macros, by means of which it is determined during the test phase which program parts or functions are run through or called up and how often. Such information, which the software developer obtains by recording data during test runs, is referred to as "profiling information."

Another possibility for obtaining profiling information is by incorporating readout commands into the compiled executable program. For example, by means of the memory addresses of persistent variables, their values during execution of the program are read out. Another method of instrumenting the code generated is to have assembler code generated first from the generated (not instrumented) C code in the sense of another form of code as an interim representation by the compiler and to instrument this and next to compile the instrumented assembler code. Thus, both persistent and transient values such as stack variables, i.e., variables stored temporarily in the stack memory, can be recorded.

WO 95/02863 describes a method for generating instrumented program code; however, this is on the basis of an object-oriented code already available, wherein at the program sites, which are affected by the communication with other program sites the command operations between the objects are recorded with the respective parameters in a protocol file and then plotted graphically. One example of such a tool for automatic generation of instrumented code for control programs is the TargetLink software produced by dSpace. TargetLink software is further described on the dSpace website.

One disadvantage is that time-consuming processing steps, which are subject to error, are necessary to extract and utilize the profiling information that is important for program optimization from the graphic representation or by means of a protocol file.

According to one aspect of the present invention, a method for optimizing a control program for actuators is made available, in which the control program includes at least one first function for controlling a first actuator, and in a first step, the control program is present as an executable model, i.e., in the form of a graphic representation of the control program, for example, such as a block diagram or a state diagram, with multiple model units, e.g., constant blocks, function blocks or subdiagram blocks. A first model unit is allocated to the first function and, based on the model, an instrumented program code (this refers either to source code or to executable code) can be generated by means of a code generator for a test control program, i.e., for an as yet incompletely optimized version of the control program. First program lines and a first parameter are allocated to the first function. A test unit can process the test control program several times using predefined input values, also known as stimuli. Based on the result of the processing, a value is allocated to the first parameter, such that the value allocated to the first parameter is stored in a memory area allocated to the first model unit, and in a second step, an optimized control program is generated by the code generator with second program lines allocated to the first function, the value allocated to the first parameter being read out of the allocated memory area by an optimization unit of the code generator and compared with an allocated predetermined threshold value and/or with an allocated predetermined boundary condition, e.g., "minimization of memory demand." In general, a boundary condition can also be expressed by a threshold value. Threshold values and boundary conditions can be predefined by the user, already stored in the optimization unit or determined heuristically by the optimization unit. On the basis of the results of the comparison, the optimization unit decides whether the second program lines allocated to the first function are tied into the control program directly or by a subprogram retrieval. The method described here may be run through iteratively by again providing the control program that was generated in the second step and optimized, but not yet fully optimized, with instrumentation, i.e., generating and using it as an additional test control program, on the basis of which new profiling information is again collected and stored accessibly for the optimization unit for an additional optimization step. In accordance with one aspect of the invention, the user can predetermine how many iteration steps may be run through at the maximum. If certain predefined boundary conditions cannot be met, the optimization unit may, for example, decide on the basis of heuristics or propose to the user that the boundary conditions be modified or that a decision be made on the basis of heuristics and that a report on this optionally be generated for the user.

In accordance with one aspect of the invention at least one value of a desired parameter is determined and stored automatically on the basis of test runs of the control program with representative predefined values, also known as stimuli, within the test unit by the instrumented program code on the test control program and then the stored value is made available for an optimization unit. By automatically storing the information allocated to the individual functions, also known as profiling information, in the form of at least one value of a parameter, which the optimization unit of the code generator can automatically access, one aspect of the present invention provides an optimization aid for generating a highly efficient control program. This makes it possible to largely avoid a complex manual collection, which is subject to errors, and providing profiling information for the optimization unit. In addition, it is advantageous in accordance with another aspect of the invention that the stored value of a parameter is associated with a model unit. Thus, profiling information may be stored on a higher level of abstraction than the program code.

As the starting point for the optimization, the control program may be generated as an executable model, e.g., in the form of a block diagram, i.e., functions can be represented and executed with the help of blocks. A function may be represented by a single block, for example, or by groups of blocks in a block diagram, where the blocks are preferably connected by lines which indicate the data flow and/or control flow. A control program can be represented and executed by such blocks and lines. Individual functions represented by several blocks or a group of blocks may also be combined in a subdiagram of a block diagram, i.e., a submodel. The subdiagrams have connections to other subdiagrams and/or functions or individual blocks with which signals are exchanged. The connections between the different block diagram units listed above can also be represented as lines.

The term "instrumented control program" may be understood to refer either to a program code of the control program in a programming language such as C or C++ or an executable program, which may also contain, in addition to the actual functionality, code components, either on a source code level or an object code level, which allow the readout of values of variables or recording of the number of executions of a function. In contrast with a fully optimized control program code generated in a final step, the instrumented code may contain so-called logging macros or logging functions, for example. On the basis of such logging macros or functions, it is possible for the test unit to acquire information about a function, e.g., the number of function retrievals and to store it. With both types of instrumented programs, profiling information can be collected as part of a "software-in-the-loop" simulation or "processor-in-the-loop" simulation.

The term "actuator" may include not only final control elements such as electromechanical devices, in particular electric motors and/or relays, but also sensor devices.

For collecting profiling information, the instrumented test control program may be run through repeatedly in part or completely within the test unit, where the program is subjected various stimuli which are supplied by the user. One example of profiling information, which can be allocated to a function as a parameter for optimization purposes, is a number indicating how often the function is retrieved and/or run through during a test control program run or the average number of function retrievals, averaged over all program runs with different stimuli.

According to a further aspect of the invention, a memory area may be allocated directly to the model, which in general comprises multiple model units. It is possible to assign a submodel to each function and to assign a first submodel to the first function. Furthermore, the memory area may comprise individual subareas and one memory subarea may be allocated to each submodel.

In another aspect of the invention, another parameter may be allocated by the test unit to the first function, and the value allocated to the second parameter may be stored in the memory subarea allocated to the first function. On the other hand, different parameters such as the execution time of a function and/or the number of function retrievals may also be linked by the test unit. In addition, according to another aspect of the invention, a second function having additional parameters may be provided, and a second submodel and a second memory subarea may be allocated to the second function. Multiple functions of an actuator or functions of a second actuator or of additional actuators, which have only one function, for example, can be controlled in this way by the test control program and also by the optimized control program.

In processing the test control program for the test unit it is possible to detect the number of retrievals of the function during a program run as the value of the first parameter of a function and/or to determine a statistical mean for the number of function retrievals or function runs for a plurality of test program runs with representative stimuli and to store this statistical mean in the respective allocated memory subarea.

In addition, the test unit may detect the execution time of the function and/or a representative statistical mean as the value of the second parameter of a function and to store it in the allocated memory subarea. To determine the execution time or a function, so-called "counter" registers may be used as timers. Thus, the number of processor clock steps executed can also be determined. To obtain a qualitative measure, it is possible to subtract the number of processor clock steps used alone for instrumentation of the logging macros or functions. For a quantitative measure, the non-instrumented code may be considered.

In addition, according to another aspect of the invention, it is possible to detect at least one type of memory capacity demand of the function as the value of an additional parameter of a function by the test unit and to store it in a portion of the memory subarea allocated to that function. There may be at least two types of memory capacity with regard to which the control program can be optimized, either individually or jointly by a link.

A first type of memory capacity may be the size of the volatile memory (RAM) required by the stack memory. To determine the stack memory demand of a function, so-called "hook functions" can be executed in processing the test control program before and after execution of the function. Before execution, the free memory area may be written with a sample, and after execution of the function, the area overwritten during execution may be determined, thereby determining the stack memory usage.

In a further aspect of the invention, the value of the stack memory capacity demand may be a statistical mean.

A second type of memory capacity may be the demand for so-called permanent memory ROM, which is needed by the function being executed. The ROM demand can be determined from the jump addresses, for example.

In another aspect of the invention, it is possible to output and/or display the individual values of the parameters allocated to a function, e.g. for control purposes, e.g., via a graphical user interface (GUI) of the block diagram. By graphic representation of the values at the respective points in the model, values such as an excessively long execution time and/or an elevated number of function retrievals and/or the size of the memory capacity required can be monitored even with complex control programs having a plurality of functions for control of a plurality of actuators. It is possible to represent only those subdiagrams in the form of blocks, i.e., functions, in color, for example, if their values detected by the test unit are above one or more predetermined threshold values and/or below one or more predetermined threshold values. The threshold values may be stored in the optimization unit and can be given/determined by the user.

According to another aspect of the invention, not only may value of a parameter be allocated to a function read by the optimization unit, but also multiple values may be read out of the memory subarea by the optimization unit and at least a portion of the values read and allocated to certain functions or all the values read may be compared with the allocated threshold values and/or boundary conditions.

The optimization unit may perform the decision for direct tie-in of the program lines allocated to a function by values exceeding or falling below multiple threshold values. The optimization unit in combination with the code generator can generate a largely optimized control program for controlling a plurality of actuators by estimates that can be made on the basis of the number of function retrievals determined with respect to the running time and the memory demand.

In a case when no decision can be made on the basis of the comparison with threshold values and/or boundary conditions, the optimization unit may propose to the user that new threshold values and/or boundary conditions be defined or that they be accessed heuristically or that only a local optimization be implemented instead of globally optimizing the control program. The latter approaches may be displayed for the user.

In another aspect of the invention embodiment, the mean value of the number of retrievals and/or executions of the first function may be determined by the test unit as the value allocated to the first parameter with respect to all test runs with different input values, i.e., representative stimuli. In another aspect of the invention, a determination may be expanded to individual parameters and/or all parameters according to suitable algorithms, such as the formation of a mean value.

The inventive method for optimization of a control program for actuators is explained in greater detail below on the basis of the exemplary embodiments in conjunction with the schematic drawing. Circuit parts having the same function here are labeled with the same reference numerals. In the drawings:

FIG. 1 shows a schematic diagram of the extraction of profiling data for allocation of the values thereby obtained to the individual memory subareas using a modeled block diagram, FIG. 2 shows a schematic diagram of generating an optimized control program using the values of the parameters.

The illustration in FIG. 1 shows in a schematic diagram a control program ST in the form of a block diagram model with a first function F1, to which a first parameter P1, a second parameter P2 and a third parameter P3 are allocated. In addition, a second function F2 having a first allocated parameter P1 and a second allocated parameter P2 is also shown. The first parameter P1 of the first function and the parameter P1 of the second function denote the same type of parameters, which are allocated to the two different functions F2 and F2. The function F1 and the function F2 are linked by another function FB. The diagram of the individual functions F1, F2 and FB is shown in individual block diagram units allocated to the respective functions. Blocks and connecting lines describe the control program ST in the form of a graph. The control program ST is therefore in the form of an executable modeled block diagram. By means of a code generator CG, an instrumented program code IPC, the test control program TST, may be created from the modeled block diagram with the individual block diagram units and may be processed repeatedly in a test unit T1 using representative stimuli supplied by the user, i.e., selected input values in a virtual test environment. The values thereby obtained, also known as the profiling information, may be saved. The test control program TST may comprise a plurality of instrumented subprogram parts, a first subprogram part IF1 being allocated to the first function F1, a second subprogram program part IF2 being allocated to the second function F2, and a third subprogram part ICFB being allocated to the additional function FB. Individual memory subareas may be allocated to the first parameter P1 and to the second parameter P2 and to the third parameter P3 of the first function F1 and/or the first parameter P1 and the second parameter P2 of the second function F2. In processing the test control program TST and thus also the individual functions F1 and F2 in the lest unit using representative stimuli, values for the respective allocated parameters may be stored in the memory subareas allocated to the respective functions. A first value W1 may be stored in the allocated memory subareas for the first parameter P1 of the first function F1, a second value W2 may be stored for the second parameter P2 of the first function, and a third value W3 may be stored for the third parameter of the first function. In addition, a value W4 may be stored for the first parameter P1 of the second function F2, and the value W5 may be stored for the second parameter P2 of the second function F2.

FIG. 2 shows schematically the automatic generation of a largely optimized program code OCC of the control program ST. In accordance with an aspect of the invention, a totality PD of the values of the individual parameters of the functions detected and stored in the test unit T1 together with the modeling information MD, i.e., the information about the control program contained in the block diagram model, may be made available to a code generator CG with an optimization unit OE. By means of the code generator CG and the optimization unit, the executable optimized control program ST may be generated, but is no longer instrumented in the final method step. In generating the optimized program code OCC, the optimization unit OE for generating the program lines of the respective function can automatically access the values stored for the function which belong to the parameters allocated to it. The optimization unit OE may compare the individual values with one or more threshold values and/or boundary conditions and can decide on the basis of the result of the comparison whether the program lines of the respective functions F1 and F2 are to be tied directly into the optimized program code OCC of the control program ST to be generated, thereby, i.e. by a repeated tie-in of the program lines allocated to a function, leading to a multiple increase in memory capacity demand in comparison with a single tie-in of the function, or to what extent the respective function is tied in by means of a subprogram and/or a function retrieval.

To reduce memory capacity demand by the control program, those functions that are not particularly time critical and are retrieved especially frequently in execution and/or processing of the control program may be tied in as a subprogram. In the case of a slow processor, fewer functions may be implemented as subprograms in the control program with a greater probability than in the case of a processor having a high capacity

The invention claimed is:

1. A method executed by a processor for optimizing a control program for actuators, the control program including a first function for controlling a first actuator, the control program having a plurality of graphical model units including a first model unit, the first model unit, first program lines and a first parameter being allocated to the first function, comprising the steps of:

generating an instrumented program code for a test control program;
repeatedly processing, the test control program using predefined input values and based on the result of said processing, allocating a value to the first parameter;
storing the value allocated to the first parameter in a memory area allocated to the first model unit;
generating an optimized control program having second program lines allocated to the first function;
reading the value allocated to the first parameter;
comparing the value allocated to the first parameter with a predefined threshold value and based on said comparing, determining whether the second program lines allocated to the first function are tied in directly to the control program or are tied in by a subprogram retrieval.

2. The method according to claim 1, wherein the memory area comprises individual memory subareas, with a memory subarea being allocated to each model unit.

3. The method according to claim 1, wherein a second parameter is allocated to the first function, and the value allocated to the second parameter is stored in the memory subarea allocated to the first model unit.

4. The method as recited claim 1, wherein the model comprises at least one second function to which additional parameters are allocated, and a second model unit and a second memory subarea are allocated to the second function.

5. The method according to claim 1, wherein the number of retrievals of a function is determined as the value of the first parameter of a function, and is stored in the memory subarea allocated to the first model unit.

6. The method according to claim 1, comprising detecting an execution time of function as a value of the second parameter of the function and storing said value of the second parameter in the allocated memory subarea.

7. The method according to claim 6, wherein counter registers are used for determining the execution time.

8. The method according to claim 1, wherein a memory capacity demand of the function is detected as the value of another parameter of a function and is stored in the allocated memory subarea.

9. The method according to claim 8, wherein the instrumented test control program contains hook functions for determining the required stack memory capacity.

10. The method according to claim 1, wherein the number of retrievals of a function is visualized for the respective model unit.

11. The method according to claim 1, wherein a second value allocated to the first function is read out of the memory subarea and compared with a respective second threshold value.

12. The method according to claim 11, wherein the determining step depends on the second threshold value or on the first threshold value.

13. The method according to claim 1, wherein at least one second actuator is controlled by the control program.

14. The method according to claim 1, wherein the optimized control program generated is provided with instrumentation and is used as the test control program and the method is terminated only after additional iteration steps.

15. The method according to claim 1, wherein the mean value from the number of retrievals and/or runs of the first function is determined as the value allocated to the first parameter with respect to all test runs with different input values.

* * * * *